United States Patent [19]

Creyf et al.

[11] Patent Number: 4,824,719
[45] Date of Patent: Apr. 25, 1989

[54] FIRE-RESISTANT INTERMEDIATE LAYER FOR COVERING ARTICLES OF SEATING FURNITURE, AND ARTICLES OF SEATING FURNITURE WHICH ARE PROVIDED WITH A COVERING CONTAINING SUCH AN INTERMEDIATE LAYER

[75] Inventors: Hubert S. G. Creyf, Brugge; Eddie R. Du Prez, Brakel, both of Belgium

[73] Assignee: Recticel, Brussels, Belgium

[21] Appl. No.: 7,016

[22] Filed: Jan. 27, 1987

[30] Foreign Application Priority Data

Jan. 31, 1986 [NL] Netherlands ............................ 8600242

[51] Int. Cl.$^4$ .............................................. B32B 3/26
[52] U.S. Cl. ...................................... 428/285; 428/71; 428/76; 428/286; 428/305.5; 428/316.6; 428/317.1; 428/921
[58] Field of Search ............. 428/71, 76, 316.6, 305.5, 428/317.9, 921, 317.1, 317.7, 921, 246, 285, 286; 521/906

[56] References Cited

U.S. PATENT DOCUMENTS

| | | | |
|---|---|---|---|
| 3,647,609 | 3/1972 | Cyba | 428/317.7 |
| 4,092,752 | 6/1978 | Dougan | 521/906 |
| 4,254,177 | 3/1981 | Fulmer | 428/317.9 |
| 4,439,472 | 3/1984 | Bell | 428/71 |
| 4,504,991 | 3/1985 | Klancnik | 428/71 |

FOREIGN PATENT DOCUMENTS

| | | |
|---|---|---|
| 2283201 | 3/1976 | France . |
| 2045072 | 10/1980 | United Kingdom . |
| 2096943 | 10/1982 | United Kingdom . |
| 2155401 | 9/1985 | United Kingdom ............. 428/316.6 |

Primary Examiner—William J. Van Balen
Attorney, Agent, or Firm—Webb, Burden, Ziesenheim & Webb

[57] ABSTRACT

The present invention relates to a fire-resistant intermediate layer for covering articles of seating furniture that consist of at least a soft supporting material and a fire-resistant covering, and which fire-resistant intermediate layer comprises a combination of a layer (a) of polyurethane foam plastic rendered fire-resistant, which rests on the soft supporting material, and (b) a glass fabric which is situated on the layer of polyurethane foam plastic rendered fire-resistant.

13 Claims, 1 Drawing Sheet

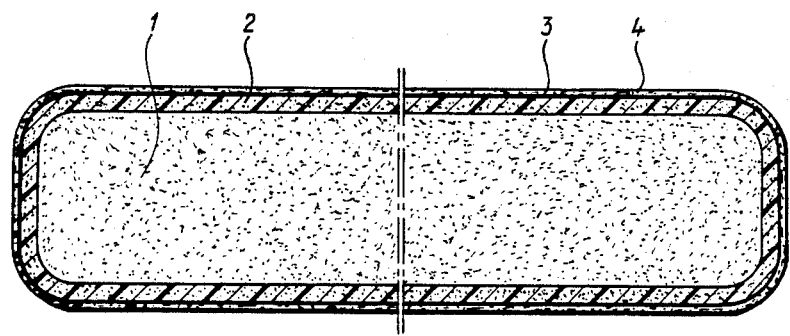

FIRE-RESISTANT INTERMEDIATE LAYER FOR COVERING ARTICLES OF SEATING FURNITURE, AND ARTICLES OF SEATING FURNITURE WHICH ARE PROVIDED WITH A COVERING CONTAINING SUCH AN INTERMEDIATE LAYER

The invention relates to a fire-resistant intermediate layer for covering articles of seating furniture, in particular aircraft seats, and articles of seating furniture which are provided with a covering containing such an intermediate layer, the article of seating furniture consisting at least of a soft supporting material and a fire-resistant covering.

Such seats are known from the issue of Aviation Week and Space Technology dated Nov. 26th, 1984, page 47. In that case the fire-resistant covering is manufactured from a combination of the products Nomex and Kevlar (polyaramide) marketed by DuPont, which products are spun round glass fibres. According to said article, other materials, such as polybenzimidazole (PBI), have also been tested. Polyurethane foam plastic is mentioned as a soft supporting material. The seating provided with a fire-resistant covering is finally also provided with a normal upholstery for articles of seating furniture.

The seats described above have been developed because of the strict requirements which are imposed, in particular by the U.S. Government, on the fire-resistant properties of aircraft seats (FAR 25, part 25, appendix F, part II, Amendment 25/29, "flammability requirements for aircraft seat cushions", final rule issued Oct. 26th, 1984). Although some combinations with a fire-resistant layer are adequate, they have a number of drawbacks: the fire-resistant covering is expensive, 2 covers are necessary per seat and certain combinations are not adequate if polyester is used as the top layer.

It has now been found that a seat as described in the introduction does not have the abovementioned disadvantages and amply fulfils the safety standards cited if the fire-resistant intermediate layer comprises a combination of a layer (a) of polyurethane foam plastic rendered fire-resistant, which rests on the soft supporting material, and a layer (b) of glass fabric which is situated on the layer of polyurethane foam plastic rendered fire-resistant.

It is surprising that the fire-resistant effect of the combination of the layers (a) and (b) according to the invention is much greater than that of the separate layers (a) and (b) respectively. It is therefore also possible to speak in this connection on an unexpected synergetic effect.

It is pointed out that, in this description "a seat" is also understood to mean other products containing a flammable filling, for example mattresses, dashboards, and the like.

The minimum thickness of layer (a) is one millimetre; the maximum thickness is not critical. The fire-resistant covering can, however, be applied in a convenient manner to the soft supporting material if the layer (a) has a thickness of at most approximately 15 mm.

The glass fabric of layer (b) consists preferably of a glass-fibre fabric which, in particular, has a weight per unit surface area of 50–1500 g/m$^2$. For example, Electroglass 82F made by Syncoglas N.V. Zele, Belgium can be used. The layer (a) preferably consists of polyurethane foam plastic rendered fire-resistant, in particular, a polyurethane foam plastic rendered fire-resistant having a density of 30–150 kg/m$^3$.

The layers (a) and (b) can be fitted loosely, but, to prevent displacement, they are preferably bonded to each other, for example glued with a fire-resistant glue. The layer (a) is also joined to the soft supporting material for the same reason.

In principle, any filling material suitable for seats can be used as the soft supporting material. However, the soft supporting material preferably consists of polyurethane foam plastic having a density of 20–60 kg/m$^3$. The thickness used for blocks of such material is in general 8–12 cm.

FIG. 1 is a cross-sectional view of a present preferred embodiment of a fire-resistant seat.

In the accompanying FIGURE a preferred embodiment according to the invention is explained in more detail. Said FIGURE shows a cross section of a seat according to the invention in which 1 denotes a block of a polymer foam plastic, such as polyurethane foam plastic or a rubber. Said foam plastic block 1 is covered with a polyurethane foam plastic 2 rendered fire-resistant, which consists, for example, of the material Firend having a thickness of 5 mm. Firend is a polyurethane foam plastic which is marketed by Recticel and has been treated inter alia with aluminium hydroxide and binding agents and which has an apparent density of 50–120 kg/m$^3$. Glass-fibre fabric 3 having a weight per unit area of 200 g/m$^2$ is glued to layer 2. Finally, the seat is provided with an upholstery 4 which may consist of 100% wool, but may also consist of a mixture thereof with other materials such as 5% nylon/95% wool. The wool can be rendered flame-resistant, for example, by the so-called ZIRPRO process. However, it is also possible to use 100% polyester as the upholstery 4. The advantage of polyester is the convenience in use which is also revealed in the easy cleaning thereof. TREVIRA CS, made by Hoechst, can, for example, be used.

The fire-resistant seat according to the invention is manufactured by applying the respective layers to the soft supporting material. Block foam plastic or shaped foam plastic is preferably used as soft supporting material. However, it is also possible to impregnate a foam plastic block with one or more fire-resistant agents, for example aluminium hydroxide. In this case it is not necessary to apply the fire-resistant covering (denoted above as 2) separately.

It has been found that seats according to the invention, in contrast to the fire-resistant seats according to the prior art, can also be covered with a polyester upper layer and still have the required fire-resistant properties according to FAR 25, appendix F, part II, amendment 25/29.

The fire-resistant seat according to the invention can be used in all articles of furniture which are situated at points having an increased fire risk, such as in cars and trains and, in particular, as the seating section or back section respectively of aircraft seats. For said last application the fire-resistant properties are of particularly great importance, also in connection with government requirements which become increasingly stricter. In this connection it is pointed out that the materials used for fire-resistant seats according to the invention amply fulfill the ATS 1000,001 test of Airbus Industry which must be regarded as the specific standard for the fire-resistant properties of aircraft seats in Europe. According to the standard FAR 25, appendix F, part II, amendment 25/29, the maximum weight loss (averaged over the seating section and the back section of an aircraft chair) in the fire test must be 10%. In the fire-resistant seats according to the invention, values of 5.1–6.5% are achieved. On the other hand, it is of importance for the use of the seats according to the invention in aircraft chairs that the materials used are as light as possible.

The invention is explained in more detail in the following examples.

EXAMPLE I

Aircraft seats were manufactured with a seating section and a back section which were provided with a fire-resistant intermediate layer according to the invention as shown in the Figure. Said seats consisted of Super Bultex B made of Recticel polyurethane foam plastic covered with a 5-mm thick layer of Firend made by Recticel (apparent density 60 kg/m$^3$), with a glass fabric having a weight of 200 g/m$^2$ and a thickness of 0.2 mm thereon. The seats rendered fire-resistant in this way were provided with a woollen ZIRPRO covering (post-treated FIRTH wool made by Furnisming Ltd. (UK)).

Said aircraft seats were subjected to the abovementioned FAR test. In this test a weight loss of 5.2, 5.4 and 5.1 respectively was measured for three different seats. The average weight loss was 5.2%.

EXAMPLE II

Tests were carried in the same way as in Example I on aircraft seats which were provided with an upholstery of 100% polyester (Trevira CS made by Hoechst). Values of the weight loss of 4.8, 6.0 and 5.6% respectively were obtained for three different chairs. The average weight loss was 5.5%.

We claim:

1. Fire-resistant intermediate layer for covering articles of seating furniture which consist at least of a soft supporting material and a fire-resistant covering characterized in that the fire-resistant intermediate layer comprises a combination of a layer (a) of polyurethane foam plastic rendered fire-resistant, which rests on the soft supporting material, and (b) a glass fabric which is situated on the layer of polyurethane foam plastic rendered fire resistant.

2. Seat according to claim 1, characterized in that the glass fabric of layer (b) has a weight per unit surface area of 50–1500 g/m$^2$ and a layer (a) has a thickness of 1–15 mm.

3. Seat according to claims 1 or 2, characterized in that the glass fabric of layer (b) is glass-fibre fabric and the polyurethane foam plastic rendered fire-resistant of layer (a) is a polyurethane foam plastic, rendered fire-resistant, having a density of 30–150 kg/m$^3$.

4. Seat according to claim 1 or 2, characterized in that layer (b) and layer (a) are glued to each other and layer (a) is joined to the soft supporting material.

5. Article of seating furniture according to claims 1 or 2, in particular aircraft seats, provided with a fire-resistant covering.

6. Seat according to claim 3 characterized in that layer (b) and layer (a) are glued to each other and layer (a) is joined to the soft supporting material.

7. Article of seating according to claim 3, in particular aircraft seats, provided with a fire-resistant covering.

8. Article of seating according to claim 4 in particular aircraft seats, provided with a fire-resistant covering.

9. Fire-resistant layer for covering articles of seating furniture which consists at least of a soft supporting material and a fire-resistant covering characterized in that the fire-resistant layer comprises a combination of a layer
   (a) of polyurethane foam plastic rendered fire-resistant, said layer obtained by impregnating the supporting material with a fire-resistant agent, and
   (b) a glass fabric which is situated on the layer of polyurethane foam plastic rendered fire-resistant.

10. Seat according to claim 9, characterized in that the glass fabric of layer (b) has a weight per unit surface area of 50–1500 g/m$^2$ and a layer (a) has a thickness of 1–15 mm.

11. Seat according to claims 9 or 10 characterized in that the glass fabric of layer (b) is glass-fibre fabric and the polyurethane foam plastic rendered fire-resistant of layer (a) is a polyurethane foam plastic, rendered fire-resistant, having a density of 30–150 kg/m$^3$.

12. Seat according to claims 9 or 10 characterized in that layer (b) and layer (a) are glued to each other and layer (a) is joined to the soft supporting material.

13. Article of seating furniture according to claims 9 or 10, in particular aircraft seats, provided with a fire-resistant covering.

* * * * *